(12) United States Patent
Sokka et al.

(10) Patent No.: US 12,529,190 B2
(45) Date of Patent: Jan. 20, 2026

(54) COATING COMPOSITION FOR PAPER AND PAPERBOARD

(71) Applicant: Stora Enso OYJ, Helsinki (FI)

(72) Inventors: Tuula Sokka, Imatra (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 844 days.

(21) Appl. No.: 17/056,235

(22) PCT Filed: May 14, 2019

(86) PCT No.: PCT/IB2019/053977
§ 371 (c)(1),
(2) Date: Nov. 17, 2020

(87) PCT Pub. No.: WO2019/220333
PCT Pub. Date: Nov. 21, 2019

(65) Prior Publication Data
US 2021/0214896 A1  Jul. 15, 2021

(30) Foreign Application Priority Data
May 18, 2018 (SE) .................................. 1850586-7

(51) Int. Cl.
| | |
|---|---|
| *D21H 21/30* | (2006.01) |
| *C09D 5/00* | (2006.01) |
| *C09D 5/22* | (2006.01) |
| *C09D 7/41* | (2018.01) |
| *C09D 7/61* | (2018.01) |
| *C09D 7/63* | (2018.01) |
| *C09D 125/14* | (2006.01) |
| *C09D 133/06* | (2006.01) |
| *D21H 19/38* | (2006.01) |
| *D21H 19/40* | (2006.01) |
| *D21H 19/42* | (2006.01) |
| *D21H 19/58* | (2006.01) |
| *D21H 19/82* | (2006.01) |

(52) U.S. Cl.
CPC ............. *D21H 21/30* (2013.01); *C09D 5/002* (2013.01); *C09D 5/22* (2013.01); *C09D 7/41* (2018.01); *C09D 7/61* (2018.01); *C09D 7/63* (2018.01); *C09D 125/14* (2013.01); *C09D 133/062* (2013.01); *D21H 19/385* (2013.01); *D21H 19/40* (2013.01); *D21H 19/42* (2013.01); *D21H 19/58* (2013.01); *D21H 19/822* (2013.01)

(58) Field of Classification Search
None
See application file for complete search history.

(56) References Cited

U.S. PATENT DOCUMENTS

| | | | |
|---|---|---|---|
| 4,386,965 A | 6/1983 | Werner et al. | |
| 4,600,439 A | 7/1986 | Schneider et al. | |
| 5,856,398 A * | 1/1999 | Oizumi | D21H 19/38 524/436 |
| 9,512,569 B1 * | 12/2016 | Meng Jun | D21H 17/06 |
| 2003/0005527 A1 * | 1/2003 | Deckers | C09B 67/0071 8/536 |
| 2005/0075453 A1 | 4/2005 | Klemens et al. | |
| 2007/0266894 A1 * | 11/2007 | Davenport | D21H 21/28 106/206.1 |
| 2009/0281221 A1 | 11/2009 | Letzelter et al. | |
| 2010/0143738 A1 | 6/2010 | Bloembergen et al. | |
| 2011/0008637 A1 | 1/2011 | Broadus et al. | |
| 2015/0035926 A1 * | 2/2015 | Pal | B41J 2/01 428/32.34 |
| 2017/0081541 A1 | 3/2017 | Makarainen et al. | |
| 2017/0356135 A1 * | 12/2017 | Biza | D21H 19/82 |

FOREIGN PATENT DOCUMENTS

| | | |
|---|---|---|
| EP | 1080937 A1 | 3/2001 |
| GB | 2076011 | 11/1981 |
| GB | 2277749 | 11/1994 |
| WO | 0144210 A1 | 6/2001 |
| WO | 2007145577 A1 | 12/2007 |
| WO | 2011084692 A1 | 7/2011 |
| WO | 2012006079 A1 | 1/2012 |
| WO | 2013095373 A1 | 6/2013 |
| WO | 2016105417 A1 | 6/2016 |

* cited by examiner

*Primary Examiner* — Chinessa T. Golden
(74) *Attorney, Agent, or Firm* — Greer, Burns & Crain, Ltd.

(57) ABSTRACT

The present invention relates to a coating composition for coating of paper or paperboard, said composition comprising: a pigment, a binder, an optical brightening agent (OBA), a colorant, and a sugar alcohol, and to paper or paperboard coated with at least one layer of the coating composition. The present invention further relates to a method for preparing said coating composition and to an OBA premix useful in the method of preparing the coating composition, said premix comprising an OBA, a sugar alcohol, and optionally a colorant, wherein the OBA and sugar alcohol together make up at least 10% by weight, preferably at least 20% by weight, based on the total weight of solids in the premix.

21 Claims, No Drawings

COATING COMPOSITION FOR PAPER AND PAPERBOARD

This application is a U.S. National Phase under 35 U.S.C. § 371 of International Application No. PCT/IB2019/053977 filed May 14, 2019, which claims priority under 35 U.S.C. §§ 119 and 365 to Swedish Application No. 1850586-7, filed May 18, 2018.

TECHNICAL FIELD

The present disclosure relates to coating compositions for improving optical properties, particularly the whiteness, of paper or paperboard, wherein the composition comprises at least a pigment and an optical brightening agent (OBA). The disclosure further relates to methods for preparing such coating compositions and to paper or paperboard coated with such coating compositions.

BACKGROUND

Optical properties are of essential importance in paper or paperboard. The brightness of pulp, fillers and coating pigments is often not high enough to reach the requirements for coated paper and paperboard products. In order to improve brightness of the coated paper a coating additive called an optical brightening agent (OBA) is often used. Optical brightening agents are also known under the names optical whitening agents, or fluorescent whitening agents (FWA).

The OBA absorbs ultraviolet light (having a wavelength of 300-360 nm) invisible to the human eye and re-emits the light at wavelengths visible to the human eye. The re-emission is typically within the wavelength range of 430-470 nm, where the light has a blue hue. This process is perceived by the human eye as if the brightness and/or the whiteness of the coated paper is increased.

Most, but not all, of the OBAs used in the paper industry, are based on the stilbene molecule and are typically Na-salts. The main difference is the number of solubilizing sulfonic groups. Disulfonated stilbene OBAs have two sulfonic groups; the two other substituents could be hydrophilic groups. This OBA has a very good affinity to fibers in papermaking, but limited solubility. The most commonly used OBAs are the tetrasulfonated stilbene OBAs. Tetra-sulfonated OBAs are versatile products because they provide a combination of medium affinity and good solubility. The hexasulfonated stilbene OBAs are specialties used mostly in coatings or surface sizing applications where high brightness is required.

The performance of OBAs is dependent on so called carrier chemicals or additives. Carriers typically include water-soluble polymers such as carboxymethyl cellulose, polyvinyl alcohol, polyethylene glycol or starch. These carriers can "boost" the effect of the OBA and increase the emission of visible blue light significantly.

It is well known that the optical properties of a paper or paperboard comprising an OBA will degrade over time, and that degradation of the properties is accelerated by high exposure to light. It is also believed that degradation/ageing is further exacerbated at elevated temperatures. For example, at the reeling of paper into rolls during the manufacturing process, elevated temperature will often remain inside the roll for extended periods of time. The high temperature can decrease the whiteness or lead to optical mottle. Typically, paperboard gets warmer than paper. This is due to both drying of paper but also due to hot calendering.

It has been shown that some polymeric carriers, in addition to boosting the brightening effect of OBAs, may also limit the light-induced degradation/ageing of the OBA coating layer. However the addition of such carriers must be limited due to the fact that they will also affect the properties of the coating composition making application of the composition using the applicable coating methods more difficult. Certain additives may also influence rheological properties, solid content and coating layer dewatering and immobilization behaviour.

Therefore, there remains a need for a coating composition that provide both high and whiteness stability to light-induced as well as thermal degradation.

DESCRIPTION OF THE INVENTION

It is an object of the present disclosure to provide a coating composition for paper and paperboard that alleviates at least some of the problems decreased whiteness/brightness of coated paper or paperboard due to light and/or thermal instability of the optical properties of the coating.

It is a further object of the present disclosure to provide a coating composition for paper and paperboard that provides both high whiteness and thermal stability of the optical properties.

According to a first aspect illustrated herein, there is provided a coating composition for coating of paper or paperboard, said composition comprising:
 a pigment,
 a binder,
 an optical brightening agent (OBA),
 a colorant, and
 a sugar alcohol.

In papermaking, the term coating refers to a paper finishing operation in which the surface of a paper is covered with a composition to impart a desired finish or texture to the paper or to improve its printability or other properties, such as optical or barrier properties. Coatings provide a smooth paper surface and can also enhance, e.g., the whiteness, opacity, and gloss of paper.

Coatings are typically made up of pigments and binders (also called adhesives) as the main ingredients. Pigments are commonly made of $CaCO_3$ (such as Precipitated Calcium Carbonate (PCC) or Ground Calcium Carbonate (GCC)), clay (such as kaolin or calcined kaolin), $TiO_2$, talcum, plastic pigments, $Al_2O_3$, ATH, $SiO_2$, or nanopigments such as bentonite, or mixtures thereof. Binders are added to increase the adhesion of the particles of pigment to each other and to the paper fibers. Binders are commonly made from common natural sources such as starch, protein, or from synthetic sources, such as styrene-butadiene and vinyl acrylic latices.

The coating may for example be a pigment coating (pigment as main ingredient, followed by the binder), a pigmentization coating (binder as main ingredient and with only a small amount of pigment), or a dispersion coating.

The coating composition is preferably present in the form of a dispersion of solid particles in a suitable liquid medium.

The liquid medium may be water based or organic solvent based, or it may comprise a mixture of water or an aqueous solution with an organic solvent. In a preferred embodiment the liquid medium is water based, i.e, it is comprised of more than 50% by weight of water. In a more preferred embodiment the liquid medium is water.

The dispersion may be a dilute dispersion or a high solids dispersion. The solids content of the coating composition may generally be at least 10% by weight based on the total weight of the coating composition.

The use of a sugar alcohol for stabilizing the OBA has been found to allow for reduction or elimination of the polymeric carriers typically used for this purpose. Because the relative effect of the sugar alcohol on the viscosity of the coating composition is lower than for the polymeric carriers, higher amounts of the sugar alcohol can be used without negative effects on the processing properties of the coating composition. This in turn allows for higher solids content in the coating compositions according to the present disclosure as compared to traditional coatings using only polymeric carriers.

Preferably, the solids content of the coating composition is at least 20% by weight, more preferably at least 30%, at least 40%, or at least 50% by weight based on the total weight of the coating composition. The solids content of the coating composition is typically 80% by weight or less, preferably 75% by weight or less, more preferably 70% by weight or less, based on the total weight of the coating composition.

Preferably, the solids content of the coating composition is in the range of 20-80% by weight, more preferably in the range of 20-75%, in the range of 30-75%, in the range of 40-75%, or in the range of 50-75% by weight based on the total weight of the coating composition.

The formulation of a coating composition may vary greatly depending on the intended use of the coating and the coated paper. Coating compositions may include a wide range of ingredients in varying quantities to improve the end performance of the product or processing of the coating.

As mentioned, coatings are typically made up of pigments and binders (also called adhesives) as the main ingredients. The main ingredient of the coating composition in terms of mass fraction is often the pigment, followed by the binder. However, in some cases the binder may be the main ingredient. When the pigment is the main ingredient, the amounts of the ingredients in a coating composition are therefore commonly expressed in terms of parts by weight, based on 100 parts by weight of pigment included in the composition. Unless otherwise specified, all amounts of coating ingredients herein are expressed as parts by weight, based on 100 parts by weight of pigment included in the composition.

The pigment is preferably a white or opaque pigment. More preferably, the pigment is a white pigment. The white or opaque pigment may also be referred to as having high or low brightness respectively.

The pigment may for example be selected from the group consisting of $CaCO_3$ (such as PCC or GCC), clay (such as kaolin or calcined kaolin), $TiO_2$, talcum, plastic pigments, $Al_2O_3$, $SiO_2$, or a nanopigments such as bentonite, or a mixture thereof. In preferred embodiments the pigment is selected from the group consisting of $CaCO_3$ and clay or a mixture thereof.

Calcium carbonate ($CaCO_3$) is a bright white mineral often used in paper pulp as a filler and in coatings as a pigment. Calcium carbonate is a brighter white than clay, but it is not as bright as titanium dioxide. It is low in cost, and commonly used in place of the more expensive titanium dioxide. Clay in combination with calcium carbonate can provide improved coverage at lower coat weight. Clay pigments are typically used to e.g. provide gloss, whereas clay-$CaCO_3$ mixtures give structured coatings. The selection of pigments are made based on end requirements, mainly printability but also visual appearance.

The coating composition according to the present disclosure comprises a binder. In papermaking the term binder refers to an organic or inorganic material added to the pigment in the coating composition to assist the pigment particles in adhering to the paper fibers. The binder may include a sole-binder or a combination of a (main) binder and a co-binder. A sole-binder is a single binder that alone performs the required binder functions in a coating. Often, however, the binder system includes a combination of a main binder responsible for the binding function and a co-binder for affecting, e.g., the rheology and water retention properties of the coating. Binders are also sometimes referred to as adhesives.

Common naturally occurring binders include starch, casein, and soy protein. Common synthetic binders include styrene butadiene latexes (SB Latex), styrene acrylate latexes (SA Latex), and polyvinyl acetate latexes (PVAc Latex). The synthetic binders may allow for greater gloss and flexibility of the coated product.

In preferred embodiments, the coating composition comprises a binder selected from the group consisting of a styrene butadiene latex, a styrene acrylate latex, a polyvinyl acetate latex, and a starch. In preferred embodiments the binder is selected from the group consisting of a styrene butadiene latex, a styrene acrylate latex, and a polyvinyl acetate latex.

The binder may generally be present in the coating composition in an amount of 1-30 parts by weight, preferably 5-25 parts by weight, more preferably 10-20 parts by weight, based on 100 parts by weight of pigment included in the composition. In some embodiments, the binder is present in the coating composition in an amount of 4-18 parts by weight, preferably 5-16 parts by weight, more preferably 6-15 parts by weight, based on 100 parts by weight of pigment included in the composition.

The coating composition comprises an optical brightening agent (OBA). The OBA enhances the appearance of the color of the coating, causing a "whitening" effect by absorbing light in the ultraviolet and violet region (usually 300-360 nm) of the electromagnetic spectrum, and re-emitting light in the blue region (typically 430-470 nm) by fluorescence.

The most common class of compounds with this property are the stilbenes, for example 4,4'-diamino-2,2'-stilbenedisulfonic acid, but other classes of compounds may also be used, such as distyrylbiphenyl derivatives.

In some embodiments of the coating composition, the OBA is selected from the group consisting of stilbene and distyrylbiphenyl derivatives. In some embodiments, the OBA is a di-, tetra-, or hexa-sulfonated stilbene. In preferred embodiments, the OBA is a tetra-sulfonated stilbene. Tetra-sulfonated OBAs are preferred because in coating compositions according to the present disclosure since they provide a combination of medium affinity and good solubility.

The OBA may generally be present in the coating composition in an amount of 0.05-3 parts by weight, preferably 0.1-2 parts by weight, based on 100 parts by weight of pigment included in the composition.

The coating composition according to the present disclosure comprises, in addition to the pigment, the binder, and the optical brightening agent (OBA) typically present in coating compositions for improving whiteness/brightness of paper or paperboard, also a combination of a colorant and a sugar alcohol. The combination of a colorant and a sugar alcohol has been found to provide a range of advantageous effects when added to a coating composition comprising pigment and OBA. Advantages include improved thermal stability of the OBA, improved thermal stability of the colorant, enhanced/boosted effect of the OBA and enhanced/boosted effect of the colorant. The enhanced/boosted effect of the OBA and/or colorant may be due to a dispersing or activating effect of the sugar alcohol.

The coating composition according to the present disclosure comprises a sugar alcohol. The addition of a sugar alcohol to the coating composition has been found to simultaneously improve the thermal stability of the optical properties, specifically the whiteness, and enhance/boost the optical effect of the OBA as well as the colorant.

Sugar alcohols (also called polyhydric alcohols, polyalcohols, alditols or glycitols) is a class of polyols. Sugar alcohols are white, water-soluble solids that can occur naturally or be produced industrially from sugars. They are used widely in the food industry as thickeners and sweeteners. Both disaccharides and monosaccharides can form sugar alcohols and the number of carbon atoms of the molecules typically range from 3-24. Common examples of sugar alcohols include, but are not limited to glycerol (3-carbon), erythritol (4-carbon), threitol (4-carbon), arabitol, (5-carbon), xylitol (5-carbon), Ribitol (5-carbon), mannitol (6-carbon), Sorbitol (6-carbon), galactitol (6-carbon), fucitol (6-carbon), iditol (6-carbon), inositol (6-carbon), volemitol (7-carbon), isomalt (12-carbon), maltitol (12-carbon), lactitol (12-carbon), maltotriitol (18-carbon) and maltotetraitol (24-carbon).

In some embodiments of the coating composition, the sugar alcohol is selected from the group consisting of xylitol, sorbitol, mannitol, maltitol, lactitol, or a mixture thereof. In some embodiments the sugar alcohol is selected from the group consisting of xylitol or sorbitol, mannitol, glycerol, or a mixture thereof.

In a preferred embodiment the sugar alcohol is selected from the group consisting of xylitol and sorbitol or a mixture thereof. Xylitol and sorbitol have been found to be particularly efficient for improving the thermal stability of the optical properties and enhancing/boosting the optical effect of the OBA as well as the colorant.

In a more preferred embodiment the sugar alcohol is xylitol. Some sugar alcohols, including sorbitol, have been found to be sensitive to microbes, which affects pH and can give rise to deposits of, e.g., Ca-complexes. This sensitivity to microbes can cause problems is some applications. In addition to providing thermal stability to the OBA and colorant, xylitol is believed to give less problems with microbes, making it especially useful in these applications. In addition, xylitol has a mint flavor which is beneficial for taste masking. It has been shown that xylitol has the same effect on as sorbitol.

The sugar alcohol may generally be present in the coating composition in an amount of 0.05-10 parts by weight, preferably 0.1-7 parts by weight, based on 100 parts by weight of pigment included in the composition.

The coating composition according to the present disclosure comprises a colorant. The colorant further enhances the appearance of the color of the coating. The colorant may be a dye or a pigment or a combination thereof.

The colorant is not white. In a preferred embodiment, the colorant provides a blue or violet tint to a surface coated with the composition. The blue or violet tint is perceived by the human eye as if the brightness and/or the whiteness of the coated paper is increased.

In some embodiments, the colorant is a colored pigment. In some embodiments, the colorant is a colored dye. The colorant used in the coating composition according to the present disclosure preferably comprises a pigment or a non-ionic or anionic direct dye.

In some embodiments, the colorant is selected from the group consisting of Irgalite® Violet MF 60, Irgalite® Violet M 60, Irgalite® Violet BL-A, Direct Violet 35, Direct Blue 199, Direct blue 235, pigment violet 3, Pigment Blue 14, and Basic Violet 4 or a mixture thereof.

In preferred embodiments, the colorant is selected from the group consisting of Irgalite® Violet MF 60 and Irgalite® Violet M 60.

Some dyes, particularly anionic direct dyes, are chemically similar to stilbene OBAs since they include large planar/linear molecules with a delocalized π-electron systems and one or more sulfonic acid groups. This may explain, at least in part, the simultaneous improved thermal stability of the optical properties and enhanced/boosted optical effect obtained for the dye and OBA upon addition of the sugar alcohol.

Due to the low amounts required, the amount of colorant is expressed herein in g/t (grams per tonne) of the coating composition rather than in parts by weight as used for the other components. The colorant may generally be present in the coating composition in an amount in the range of 1-5000 g/t, preferably in the range of 10-1000 g/t, more preferably in the range of 50-1000 g/t, based on the total weight of the coating composition.

In some embodiments the coating composition further comprises at least one polymeric carrier. The polymeric carrier boosts the brightening effect of OBAs, and may also further limit the light-induced degradation/ageing of the coating. The polymeric carrier may preferably be selected from the group consisting of carboxymethyl cellulose, polyvinyl alcohol, polyethylene glycol and starch or a mixture thereof. In a preferred embodiment the polymeric carrier is polyvinyl alcohol.

The coating composition is preferably provided in a formulation suitable for application to paper or paperboard using conventional paper coating equipment and techniques, such blade coaters and bar coaters. Accordingly, the coating composition may include various additives to impart suitable coating characteristics. Such coating additives may include, but are not limited to, a dispersing agent (e.g. a surfactant), a lubricant (e.g. a stearate), a rheology modifier, an insolubilizer, a humectant, a barrier chemical, and a pH adjusting agent (e.g. NaOH).

It has been found that by preparing the coating composition by mixing the different components in a specific order, a more stable coating composition is obtained, and less problems with optical mottle as detected under UV light are observed. Thus, according to some embodiments, the coating composition is obtained by:
  a) mixing OBA, sugar alcohol and a colorant to obtain a first mixture,
  b) mixing a pigment with a binder, and optionally other coating additives, to obtain a second mixture, and
  c) mixing the first mixture with the second mixture to obtain the coating composition,
or by:
  a1) mixing OBA, sugar alcohol and a colorant to obtain a first mixture,
  b1) mixing the first mixture with a pigment to obtain a second mixture, and
  c1) mixing the second mixture with the binder, and optionally other coating additives, to obtain the coating composition.

A coating composition obtained by this method, i.e. by first mixing OBA, sugar alcohol and a colorant, is more stable and exhibits less problems with optical mottle as detected under UV light than compositions obtained by mixing the components in other orders.

In a more specific embodiment, the coating composition comprises, in parts by weight, based on 100 parts by weight of pigment included in the composition (pph): 100 pph of a pigment, 1-30 pph of a binder, 0.05-3 pph of an optical brightening agent (OBA), 0.05-2 pph of a colorant, and 0.05-10 pph of a sugar alcohol.

In another more specific embodiment, the coating composition comprises, in parts by weight, based on 100 parts by weight of pigment included in the composition (pph): 100 pph of a pigment, 5-25 pph of a binder, 0.1-2 pph of an optical brightening agent (OBA), 0.05-2 pph of a colorant, and 0.1-7 pph of a sugar alcohol.

In another more specific embodiment, the coating composition comprises, in parts by weight, based on 100 parts by weight of pigment included in the composition (pph): 100 pph of a pigment selected from the group consisting of $CaCO_3$ or clay or a mixture thereof, 5-25 pph of a binder selected from the group consisting of a styrene butadiene latex, a styrene acrylate latex, and a polyvinyl acetate latex, 0.1-2 pph of an optical brightening agent (OBA), wherein the OBA is a di-, tetra-, or hexa-sulfonated stilbene, 0.05-2 pph of a colorant, and 0.1-7 pph of a sugar alcohol, wherein the sugar alcohol is sorbitol or xylitol.

The coating composition according to the present disclosure may be prepared by mixing the pigment, binder, OBA, colorant and sugar alcohol in any conceivable order. However, the present inventors have found that by mixing the components in a specific order a more stable coating composition can be obtained.

According to a second aspect illustrated herein, there is provided a method of preparing a coating composition for coating of paper or paperboard, said method comprising the steps:
 a) mixing OBA, sugar alcohol and a colorant to obtain a first mixture,
 b) mixing a pigment with a binder, and optionally other coating additives, to obtain a second mixture, and
 c) mixing the first mixture with the second mixture to obtain the coating composition.

Or, as an alternative:
 a1) mixing OBA, sugar alcohol and a colorant to obtain a first mixture,
 b1) mixing the first mixture with a pigment to obtain a second mixture, and
 c1) mixing the second mixture with the binder, and optionally other coating additives, to obtain the coating composition.

A coating composition obtained by this method, i.e. by first mixing OBA, sugar alcohol and a colorant, is more stable and exhibits less problems with optical mottle as detected under UV light than compositions obtained by mixing the components in other orders.

The pigment, binder, OBA, colorant, sugar alcohol and optional other coating additives used in the preparation method according to the second aspect may be further defined as set out above with reference to the coating composition according to the first aspect.

According to a third aspect illustrated herein, there is provided a method of coating paper or paperboard, said method comprising the steps:
 a) providing a paper or paperboard, and
 b) applying to a surface of said paper or paperboard at least one layer of the coating composition as defined herein with reference to the first aspect.

The pigment, binder, OBA, colorant, sugar alcohol and optional other coating additives used in the coating method according to the third aspect may be further defined as set out above with reference to the coating composition according to the first aspect.

The coating weight required, or how much coating is added to a base stock of paper, is determined by the final basis weight of the paper and the intended end-use. A typical grammage for a pigment coating may be in the range of 3-15 $g/m^2$ per layer of coating, whereas a typical grammage for a pigmentization (low pigment concentration) coating may be in the range of 1-8 $g/m^2$ per layer of coating.

The coating can be a single, double or triple layer coating wherein the coating composition according to the present disclosure can be used in one or several layers.

Coatings can either be added on the papermaking machine (on-machine coating) or on a separate machine (off-machine coating). A variety of paper coating equipment and techniques may be used for applying the coating composition, for example blade coaters, air knife coaters, and cast coaters. The coating composition can be applied to one side or both sides of the paper or paperboard.

According to a fourth aspect illustrated herein, there is provided a paper or paperboard coated with at least one layer of a coating composition as defined herein with reference to the first aspect.

The pigment, binder, OBA, colorant, sugar alcohol and optional other coating additives of the paper or paperboard coating of the fourth aspect may be further defined as set out above with reference to the coating composition according to the first aspect.

The coated paper or paperboard preferably has a CIE whiteness (D65/10°+UV) above 120%, preferably above 125%, more preferably above 130%. The CIE b*(D65/10°+UV) of the coated paper or paperboard may preferably be in the range of from −8 to −12.

The thermal stability of the optical properties, particularly the CIE whiteness, of the coating is better as compared to the thermal stability of the optical properties of the same coating without the sugar alcohol.

The coated paper or paperboard according to the fourth aspect may also further comprise a polymeric coating layer. In some embodiments, the paper or paperboard according to the fourth aspect, further comprises at least one polymeric coating layer, preferably comprising polyethylene (PE), polyethylene terephthalate (PET), polypropylene (PP) and/or polylactic acid (PLA), arranged such that the coating composition according to the first aspect is sandwiched between the paper or paperboard and the polymeric coating layer. Other polymers suitable for extrusion or lamination coating may also be used. Examples include, but are not limited to polyethylene furanoate (PEF) and polyglycolic acid (PGA). The polymers may be fossil-based or bio-based.

The polymeric coating layer can be extrusion coated or laminated onto the paper or paperboard coated with the coating composition according to the first aspect. The polymeric coating layer is preferably formed by extrusion coating of a polymer onto the paper or paperboard coated with the coating composition according to the first aspect.

The present inventors have found that coating composition obtained by first mixing OBA, sugar alcohol and a colorant, is more stable and exhibits less problems with optical mottle as detected under UV light than compositions obtained by mixing the components in other orders. Therefore, according to a fifth aspect illustrated herein, there is provided an OBA premix for addition to a coating composition, the premix comprising an OBA,
a sugar alcohol, and optionally
a colorant,
wherein the OBA and sugar alcohol together make up at least 10%, preferably at least 20% by weight, preferably at least 30% by weight, based on the total weight of solids in the premix.

The OBA premix can be added to a coating composition to obtain high whiteness with improved thermal stability in a stable formulation with less problems with optical mottle as detected under UV light.

In some embodiments, the OBA and sugar alcohol together make up at least 40%, 50%, 60%, 70% or 80% by weight, based on the total weight of solids in the premix.

The weight proportion of OBA to sugar alcohol in the OBA premix is preferably selected such that a suitable weight proportion of OBA to sugar alcohol is obtained in the coating composition. Typically, the weight proportion of OBA to sugar alcohol in the OBA premix is in the range of from 1:200 to 60:1.

In some embodiments, the OBA premix further comprises a colorant. In some embodiments, the colorant is a colored pigment. In some embodiments, the colorant is a colored dye. The colorant used in the coating composition according to the present disclosure preferably comprises a pigment or a non-ionic or anionic direct dye.

In some embodiments, the colorant is selected from the group consisting of Irgalite® Violet MF 60, Irgalite® Violet M 60, Irgalite® Violet BL-A, Direct Violet 35, Direct Blue 199, Direct blue 235, pigment violet 3, Pigment Blue 14, and Basic Violet 4 or a mixture thereof.

In preferred embodiments, the colorant is selected from the group consisting of Irgalite® Violet MF 60 and Irgalite® Violet M 60.

In some embodiments the OBA premix further comprises at least one polymeric carrier. The polymeric carrier boosts the brightening effect of OBAs, and may also further limit the light-induced degradation/ageing of the coating. The polymeric carrier may preferably be selected from the group consisting of carboxymethyl cellulose, polyvinyl alcohol, polyethylene glycol and starch or a mixture thereof. In a preferred embodiment the polymeric carrier is polyvinyl alcohol.

The OBA premix is preferably provided in a formulation suitable for being added to a coating composition. Accordingly, the coating composition may include various additives to impart suitable characteristics. Such coating additives may include, but are not limited to, a dispersing agent (e.g. a surfactant), a lubricant (e.g. a stearate), a rheology modifier, an insolubilizer, a humectant, a barrier chemical, and a pH adjusting agent (e.g. NaOH).

The OBA, sugar alcohol, and optional additives of the OBA premix according to the fifth aspect may be further defined as set out above with reference to the coating composition according to the first aspect.

The OBA premix may be present in the form of a dispersion of solid particles in a suitable liquid medium.

The liquid medium may be water based or organic solvent based, or it may comprise a mixture of water or an aqueous solution with an organic solvent. In a preferred embodiment the liquid medium is water based, i.e, it is comprised of more than 50% by weight of water.

The dispersion may be a dilute dispersion or a high solids dispersion. The solids content of the OBA premix may generally be at least 10% by weight based on the total weight of the OBA premix.

Preferably, the solids content of the OBA premix is at least 20% by weight, more preferably at least 30%, at least 40%, or at least 50% by weight based on the total weight of the OBA premix.

Preferably, the solids content of the OBA premix is in the range of 20-90% by weight, more preferably in the range of 30-80%, in the range of 40-80%, or in the range of 50-90% by weight based on the total weight of the OBA premix.

Optical properties referred to herein are as measured according to the following methods and standards:

C/2 brightness (ISO-brightness): Based on ISO 2470-1 standard. C/2 does not take account the effect of OBA and dyes used in paper/paperboard.

D65/10 brightness: Based on standard ISO 2470-2. D65 takes account the effect of OBA and dyes used in paper/paperboard.

CIE whiteness C/2: Based on ISO 11476 standard and CIE whiteness D65 on ISO 11475 standard.

L*a*b*C/2 shade: Based on ISO 5631-1 standard and L*a*b*D65 shade on ISO 5631-2 standard.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLES

Example 1—Preparation of Coating Composition and Coated Paperboard

Coating dispersions were prepared by mixing pigment slurry, latex emulsion, OBA, colorant and additives as set out in Table 1. The targeted solid content was 67% by weight and the pH was controlled and adjusted to 9.0 with NaOH. The formulations were prepared with and without ("Ref") xylitol (1A) and sorbitol (1B), respectively (see Table 1). Xylitol was added in dry form while Sorbitol was added as a concentrated paste. Unless otherwise specified, all amounts of coating ingredients herein are expressed as parts by weight, based on 100 parts by weight of pigment included in the composition.

TABLE I

Composition of Pre-coat and top coat.

| PRE-COAT | Ref | 1A | 2A |
|---|---|---|---|
| CaCO₃ | 100 | 100 | 100 |
| Co-binder (PVA) | 1.8 | 1.8 | 1.8 |
| Binder (SA-latex) | 13 | 13 | 13 |
| OBA (tetrasulfonated stilbene) | 0.5 | 0.5 | 0.5 |

| TOP-COAT | Ref | 1B | 2B |
|---|---|---|---|
| CaCO₃ | 85 | 85 | 85 |
| Clay (kaolin) | 15 | 15 | 15 |
| Co-binder (PVA) | 2.0 | 2.0 | 2.0 |
| Binder (SA-latex) | 14 | 14 | 14 |

TABLE I-continued

Composition of Pre-coat and top coat.

| | | | |
|---|---|---|---|
| OBA (tetrasulfonated stilbene) | 0.7 | 0.7 | 0.7 |
| Colorant (violet pigment) (g/t) | 425 | 425 | 425 |
| Xylitol | — | 5 | — |
| Sorbitol | — | — | 4 |
| Coat weight (g/m²) | 12.5 | 11.3 | 10.5 |

A 250 gsm SBS paperboard was top side (ts) coated with two layers of the coating compositions using a bar coater targeting approximately 10.5-12.5 g/m² per layer, i.e. targeting a total coat weight of 21-25 g/m². The double coated paperboard samples were gently dried and the optical properties of the coated samples were analyzed.

The results of the analysis are presented in Table II. The CIE whiteness and shade (L*a*b*) values were measured using an L&W Elrepho spectrophotometer, a meter that is based on the ISO 2469 standard. Brightness, whiteness and shade were determined across the whole spectrum, wavelengths 400-700 nm. In addition, the optical properties were measured both with and without UV light.

Table II shows that the reference has high brightness, whereas CIE whiteness is higher with xylitol (and sorbitol). Also, the shade is more reddish and blueish.

The measurement standards used were:

C/2 brightness (ISO-brightness): Based on ISO 2470-1 standard. C/2 does not take account the effect of OBA and dyes used in paper/paperboard.

D65/10 brightness: Based on standard ISO 2470-2. D65 takes account the effect of OBA and dyes used in paper/paperboard.

CIE whiteness C/2: Based on ISO 11476 standard and CIE whiteness D65 on ISO 11475 standard.

L*a*b*C/2 shade: Based on ISO 5631-1 standard and L*a*b*D65 shade on ISO 5631-2 standard.

TABLE II

Optical properties of coated samples before heat treatment.

| Property | | Ref | 1A | 2B |
|---|---|---|---|---|
| brightness C/2° +UV, ts | % | 95.76 | 95.86 | 95.91 |
| brightness D65/10° +UV, ts | % | 104.95 | 105.39 | 105.61 |
| CIE whiteness C/2° +UV, ts | % | 108.42 | 108.88 | 108.98 |
| CIE whiteness D65/10° +UV, ts | % | 132.94 | 134.19 | 134.68 |
| L* C/2° +UV, ts | | 96.28 | 96.25 | 96.26 |
| L* D65/10° +UV, ts | | 96.91 | 96.91 | 96.93 |
| a* C/2° +UV, ts | | 2.26 | 2.33 | 2.33 |
| a* D65/10° +UV, ts | | 3.01 | 3.07 | 3.1 |
| b* C/2° +UV, ts | | −3.94 | −4.06 | −4.07 |
| b* D65/10° +UV, ts | | −9.22 | −9.5 | −9.61 |

Example 2—Analysis of Coating Optical Properties after Thermal Treatment

The thermal stability of the coating formulations was evaluated. Thermal treatment was done by storing the samples prepared in Example 1 in oven at 65° C. for 7 days, after which the optical properties were determined and compared. The optical measurements were done as described in Example 1.

After heat treatment, the obtained optical values show that the sample comprising sugar alcohols has a higher thermal stability, i.e. less change in optical properties. Note that the values after heat treatment are reported as Delta values, i.e. the change compared to the value measured before heat treatment. A lower absolute value thus means less reduction of the whiteness.

TABLE III

Optical properties of coated samples after heat treatment.

| Property | | Ref | 1A | 1B |
|---|---|---|---|---|
| D65/10° +UV, ts | Delta | 4.45 | 3.35 | 3.38 |
| CIE D65/10° +UV, ts | Delta | 12 | 8.6 | 8.7 |
| L* D65/10° +UV, ts | Delta | 0.29 | 0.23 | 0.23 |
| a* D65/10° +UV, ts | Delta | 0.65 | 0.45 | 0.46 |
| b* D65/10° +UV, ts | Delta | −2.6 | −1.9 | −1.9 |

(ts = top side,
+UV = measured with UV light)

The invention claimed is:

1. A coating composition for coating of paper or paperboard, said composition consisting essentially of:
    a white pigment,
    a binder,
    an optical brightening agent (OBA),
    a non-white colorant comprising a colored pigment, or a colored dye, or a combination thereof, and wherein an amount of the non-white colorant in the coating composition is in a range of 1 to 5000 g/t, based on a total weight of the coating composition, and
    a sugar alcohol.

2. The coating composition according to claim 1, wherein the white pigment is selected from a group consisting of: $CaCO_3$, clay, $TiO_2$, talcum, plastic pigments, $Al_2O_3$, $SiO_2$, or a nanopigments, and mixtures thereof.

3. The coating composition according to claim 1, wherein the binder is selected from a group consisting of: a styrene butadiene latex, a styrene acrylate latex, a polyvinyl acetate latex, and a starch.

4. The coating composition according to claim 1, wherein the OBA is selected from a group consisting of: stilbene and distyrylbiphenyl derivatives.

5. The coating composition according to claim 1, wherein the non-white colorant comprises the colored pigment or a colored non-ionic or anionic direct dye.

6. The coating composition according to claim 1, wherein the non-white colorant provides a blue or violet tint to a surface coated with the composition.

7. The coating composition according to claim 1, wherein the sugar alcohol is selected from a group consisting of: xylitol, sorbitol, mannitol, maltitol, lactitol, and mixtures thereof.

8. The coating composition according to claim 1, wherein an amount of the OBA in the composition is between 0.05 to 3 parts by weight, based on 100 parts by weight of the pigment included in the composition.

9. The coating composition according to claim 1, wherein an amount of the sugar alcohol in the composition is between 0.05 to 10 parts by weight, based on 100 parts by weight of the pigment included in the composition.

10. The coating composition according to claim 1, further comprising at least one polymeric carrier.

11. The coating composition according to claim 1, further comprising at least one coating additive selected from a group consisting of: a dispersing agent, a lubricant, a rheology modifier, an insolubilizer, a humectant, a barrier chemical, and a pH adjusting agent.

12. The coating composition according to claim 1, wherein the composition is obtained by:

a) mixing the OBA, the sugar alcohol, and the non-white colorant to obtain a first mixture,
b) mixing the white pigment with the binder to obtain a second mixture, and
c) mixing the first mixture with the second mixture to obtain the coating composition,
or by:
a1) mixing the OBA, the sugar alcohol, and the non-white colorant to obtain a first mixture,
b1) mixing the first mixture with the white pigment to obtain a second mixture, and
c1) mixing the second mixture with the binder to obtain the coating composition;
wherein the non-white colorant comprises a colored pigment, or a colored dye, or a combination thereof, and wherein an amount of the non-white colorant in the coating composition is in the range of 1 to 5000 g/t, based on the total weight of the coating composition.

13. A paper or paperboard coated with at least one layer of a coating composition according to claim 1.

14. The paper or paperboard according to claim 13, wherein the coated paper or paperboard has a CIE whiteness (D65/10°+UV) above 120%.

15. The paper or paperboard according to claim 13, wherein a thermal stability of optical properties of the coating is better as compared to a thermal stability of the properties of a same coating without the sugar alcohol.

16. The paper or paperboard according to claim 13, further comprising at least one polymeric coating layer arranged such that the coating composition according to claim 1 is sandwiched between the paper or paperboard and the polymeric coating layer.

17. A paper or paperboard according to claim 16, wherein the polymeric coating layer is formed by extrusion coating of a polymer onto the paper or paperboard coated with the coating composition according to claim 1.

18. An optical brightening agent (OBA) premix for addition to a coating composition, the premix comprising:
an OBA,
a sugar alcohol, and
a non-white colorant comprising a colored pigment, or a colored dye, or a combination thereof,
wherein the OBA and sugar alcohol together make up at least 10% by weight, based on a total weight of solids in the premix.

19. The OBA premix according to claim 18, wherein a weight proportion of the OBA to the sugar alcohol is in a range of from 1:200 to 60:1.

20. A method of preparing a coating composition for coating of paper or paperboard, said method comprising the steps:
a) mixing OBA, a sugar alcohol, and a non-white colorant to obtain a first mixture,
b) mixing a white pigment with a binder to obtain a second mixture, and
c) mixing the first mixture with the second mixture to obtain the coating composition,
or the steps:
a1) mixing OBA, a sugar alcohol, and a non-white colorant to obtain a first mixture,
b1) mixing the first mixture with a white pigment to obtain a second mixture, and
c1) mixing the second mixture with a binder to obtain the coating composition;
wherein the non-white colorant comprises a colored pigment, or a colored dye, or a combination thereof, and wherein an amount of the non-white colorant in the coating composition is in the range of 1 to 5000 g/t, based on the total weight of the coating composition.

21. A method of coating paper or paperboard, said method comprising the steps:
a) providing a paper or paperboard, and
b) applying to a surface of said paper or paperboard at least one layer of a coating composition according to claim 1.

* * * * *